Jan. 10, 1961    J. B. ANDERSON    2,967,773
METHOD OF COOKING FOOD
Filed May 10, 1955
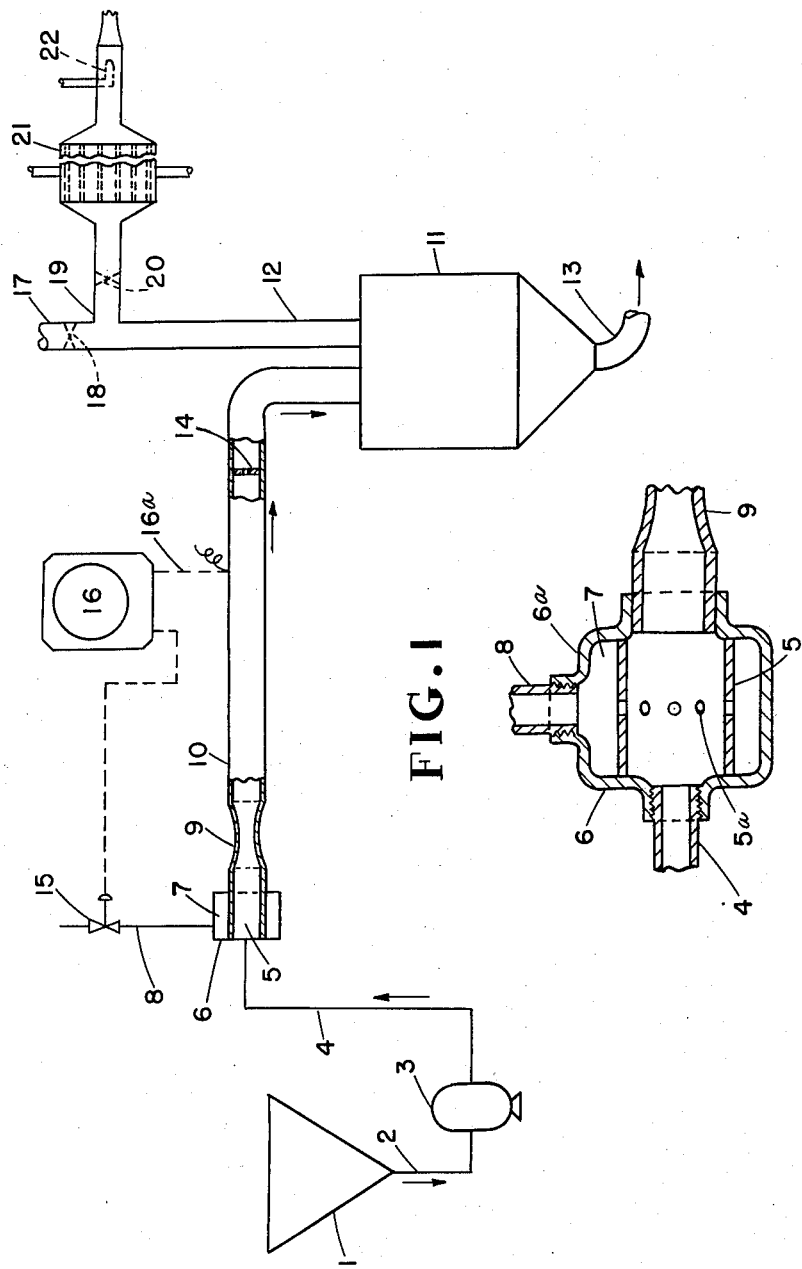
INVENTOR.
James B. Anderson
BY
Christy, Parmelee & Strickland
attorneys

United States Patent Office 2,967,773
Patented Jan. 10, 1961

2,967,773

METHOD OF COOKING FOOD

James B. Anderson, Mount Lebanon Township, Allegheny County, Pa., assignor to H. J. Heinz Company, Pittsburgh, Pa., a corporation of Pennsylvania Filed May 10, 1955, Ser. No. 507,262

2 Claims. (Cl. 99—107)

This invention is for the cooking of food and relates to a method and apparatus for the cooking of food through the use of steam in direct contact with the food particles.

A principal object of my invention is to provide an effective and simple method and apparatus for cooking food to an accurate and predetermined extent with a minimum loss of flavor and nutrients, and to subject each small particle of food to an identical heating atmosphere and environment, thereby securing more uniform cooking of the product.

A further object of the invention is to provide a more expeditious and rapid method of cooking which is continuous, as distinguished from batch operations, and which provides more uniform cooking of the food particles.

A further object of my invention is to provide a method and apparatus wherein food in a particulate condition is conveyed through an enclosed environment for a predetermined interval of time by steam which acts both as the carrier and the heating medium, while the length of travel through said environment, the steam pressure and the velocity of the steam, determine the extent of cooking.

These and other objects are obtained by my invention as will hereinafter more fully appear.

While it is a common procedure in the art to cook food by the injection of steam into a mass of food in a closed environment, the food is more or less compacted as a continuous mass or phase and the steam must penetrate or channel its way through the mass, resulting in the intense cooking of some particles with a relatively lesser cooking of others. Higher pressures of steam must be used than is required for cooking in order to force the steam through the mass. In the case of meat, this results in an undesirable separation of serum from fibers. This separation of serum is also likely to result from the mass pressure that may be placed on the mass to move it through the cooking chamber. Also these facts tend to produce a condition favorable to the cohesion or agglomeration of the particles, making the subsequent measuring of the food in industrial canning operations, such as the putting of a measured amount of meat into a measured amount of broth, quite difficult.

According to the present invention the food particles are entrained in a high velocity flow of steam so that the steam exists as a continuous phase and the particles, by reason of the velocity of the steam, are kept in suspension and as a discontinuous phase, each particle being separately enveloped in the continuous atmosphere of steam.

The pressure of the steam, the velocity and length of travel in the closed environment, as well as the rate of continuous feeding of the particles into the stream are also selected to produce the desired degree of cooking. Upon leaving the closed environment the steam and food particles discharge into a separator where the food particles drop out and the temperature, due to the expansion of the steam, is rapidly reduced.

My invention may be more fully understood by reference to the accompanying drawings, in which:

Fig. 1 is a more or less schematic view of an apparatus for practising my invention; and Fig. 2 is a detail view showing one form of contacting device for entraining the food particles in the high velocity flow of steam, the view being a vertical longitudinal section through the mixing unit.

The present invention is particularly adapted to the cooking of meat, but is also applicable to the cooking of other foods. The meat or other food is, if necessary, first chopped, ground, comminuted or mashed, so that it is processed in comminuted or particulate condition. If desired, other ingredients to be cooked with the basic food material can be included.

In the drawing 1 designates a hopper or receiver into which the previously diced or otherwise prepared food is charged. Leading from the bottom of the hopper is a pipe 2 which connects with a positive displacement type pump 3. The pump discharges the food at a predetermined uniform rate through pipe 4 into an injector having a center tube 5 constituting a mixing chamber 6. This mixing chamber as best shown in Fig. 2 comprises a casing 6a in which the tube 5 is axially positioned. The casing 6a is larger than the tube 5 providing an annular steam chamber 7. Steam is introduced into the chamber 7 through a pipe 8. The tube 5 is provided with an annular series of ports or holes 5a. Opposite the pipe 4 at the other end of the center tube 5 is a passage leading into the throat of a venturi 9, the venturi opening into an elongated tube 10. Obviously, the arrangement could be constructed so as to introduce the food through the holes 5a and the steam could be introduced through the central pipe.

The tube 10 leads to the top of a combined separator and expansion chamber 11 having an outlet pipe 12 leading from the top thereof through which the steam may be conducted after food particles entrained by the steam have been dropped to the bottom of the separator. The separator has a food discharge pipe 13 leading from the bottom thereof and a suitable valve (not shown) may be provided for controlling the discharge of food from the bottom of the separator.

Positioned in the pipe 10 at a selected distance from the throat of the venturi is an orifice plate 14 which partly but not completely obstructs the flow of steam and entrained food particles through the tube 10. The size of the orifice in the plate 14 is selected with a view to maintaining a desired pressure in and velocity through the tube and the distance between the venturi 9 and the orifice plate 14, together with the velocity of the steam determines the retention time of the food particles within the tubular section 10.

The pipe 8 which is connected with a source of steam (not shown) is provided with a selectively adjustable control valve 15 which may be a diaphragm or other pressure-responsive valve under the control of an instrument 16, the instrument 16 being connected through a line 16a with the interior of the tube 10 at a point between the venturi 9 and the orifice plate 14, so that the instrument will respond to pressure in the tube 10 and the instrument 16 in conjunction with the valve 15 maintain a continuous predetermined pressure in the tube 10.

The pipe 12 for the discharge of steam may have two branches, one of which, designated 17, is controlled by means of a valve 18 and leads directly to the atmosphere, while the other branch 19 controlled by a valve 20 leads to a condenser 21 beyond which is a vacuum-producing means so that the interior of the separator may be either at approximate atmospheric pressure or sub-atmospheric pressure, the sub-atmospheric pressure being used where the food is of a character which does not require, or should not be heated, to a temperature as high as 212° F. As a matter of fact sub-atmospheric pressure in the separator is required if a temperature much below 218° F. is used in order to move the steam and food particles at the desired velocity and keep the product entrained. It is of course apparent that the lower the pressure in the separator 11, the lower is the pressure secured within the tube 10.

In the operation of the system the particulate food substance, being forced at uniform rate into the central tube 5 of the mixing device 6 is immediately entrained in the flow of steam passing from the space 7 through the ports 5a into the interior of the tube 5. The velocity of the steam is such as to keep the particles in suspension, carrying them through the venturi 9 and through the tube 10, the particles with the steam passing through the orifice plate 14 and discharging into the separator as hereinabove described.

It will thus be seen that the flow of steam exists in a continuous phase or as a continuous stream and the food particles are diffused or dispersed in a diffused state or progression in the steam. The pressure of the steam which of course controls temperature is maintained at a predetermined constant for a particular food and the orifice plate is selected with an opening size to maintain the desired pressure and temperature, while the pressure responsive control maintains the required uniform rate of flow. The length of the tube 10 from the venturi 9 to the orifice plate 14 and the steam pressure and the velocity are all selected to assure the optimum retention of the food particles in the cooking environment in the tube 10 and after these factors have been adjusted and predetermined for a particular food, each food particle will be uniformly processed. As hereinabove indicated, if the cooking is to be effected at a temperature of less than 218° F., sub-atmospheric pressure may be maintained in the system by means of the vacuum creating means.

In place of the instrument 16 responding to pressure in the tube 10, it may of course be set to respond to temperature since the temperature and pressure are functions of one another, the temperature increasing with the increase in pressure.

The following is a typical example of the method of practising my invention:

Beef was ground into small particles through a ¼" plate. It was discharged into the cooking device at the rate of about 6 g.p.m. The steam pressure was maintained at approximately 3 p.s.i.g. in the chamber. The treating tube was about 2 inches internal diameter and the distance from the center of the throat of the venturi to the orifice plate was approximately 4 feet. The opening in the orifice plate was 1½ inches in diameter.

In most cases an orifice or restriction, such as 14 may be used for ease of selecting the most favorable conditions. However, the more gradual pressure drop resulting from flow through such pipes and fittings as may be provided will also give the desired pressure control and an orifice plate is not required.

From the foregoing it will be seen that my invention provides a method and apparatus in which food substances are entrained in a high velocity flow of steam, and while so entrained are subjected to a controlled uniform degree of cooking, that is, it is subjected to uniform conditions of time, pressure and temperature. The process may be operated continuously and the rate at which the positive displacement pump 3 is operated gives another factor of control and allows the system to be operated at a rate such as to meet the requirements of other equipment in which the processed food is subsequently used. The apparatus is relatively simple and is constructed of stainless steel or other metal which is inert to the foods being processed, and in accordance with the usual practice of the art is so constructed that it may be readily taken apart for cleaning and sterilizing. Foods which naturally exist in a particulate form may be processed, while foods that occur in larger masses must be reduced to particulate condition in order to be cooked through in the short interval of time that each food particle is retained in the apparatus, this period of time being in the most cases only an instant, and rarely more than two seconds. The invention is also applicable to the cooking of slurries, liquid suspensions, purees and other liquids or wherein liquid may be used as a vehicle, it being only necessary that the product be of a character which will flow, that is, it can be pumped or otherwise discharged into the injector and be entrained by the steam.

While I have disclosed one particular apparatus, it will be understood that various changes and modifications may be made within the contemplation of my invention and under the scope of the following claims.

I claim:

1. The method of steam cooking solid food substances which comprises comminuting the food substances into separated particles, conveying such particles as a flowable mass to a cooking environment at a controlled rate, injecting the particles in continuous progression with a high velocity flow of steam into said environment, the particles being dispersed by the steam and being then conveyed by the steam through said environment in a dispersed and suspended condition with the steam as a continuous phase suspending medium, controlling the pressure in said environment to regulate the temperature and retention time and continuously discharging the steam with the entrained particles from said cooking environment into an expansion environment where the suspended particles are dropped out of the steam and the steam substantially expanded to reduce its temperature and preclude further cooking of the particles.

2. The method of steam cooking meat which comprises grinding the meat into small particles, feeding a stream of the particles to a cooking environment at a controlled rate, injecting the particles in continuous progression with a high velocity flow of steam into said cooking environment and utilizing the steam to disperse and suspend the particles and convey them through said environment in a dispersed and suspended condition, controlling the steam pressure in said environment to regulate the temperature in said environment and the retention time of the meat particles in the environment, and continuously discharging the steam with the entrained particles into an expansion environment where the suspended meat particles are dropped out and collected and the steam substantially expanded to reduce the temperature and preclude further cooking of the meat.

References Cited in the file of this patent

UNITED STATES PATENTS

| | | |
|---|---|---|
| 1,677,912 | Bartleson | July 24, 1928 |
| 1,768,172 | Triplett | June 24, 1930 |
| 1,819,023 | Grindrod | Aug. 18, 1931 |
| 1,955,289 | Greenfield | Apr. 17, 1934 |
| 2,086,338 | Sodergreen | July 6, 1937 |
| 2,170,195 | Grindrod | Aug. 22, 1939 |
| 2,240,338 | Locke | Apr. 29, 1941 |
| 2,348,066 | Goldfine | May 2, 1944 |
| 2,406,395 | Noel | Aug. 27, 1946 |
| 2,625,488 | Wasserman et al. | Jan. 13, 1953 |
| 2,636,430 | Brown et al. | Apr. 28, 1953 |

FOREIGN PATENTS

| | | |
|---|---|---|
| 790,969 | Great Britain | Feb. 19, 1958 |